United States Patent
Kari et al.

(10) Patent No.: US 9,458,880 B2
(45) Date of Patent: Oct. 4, 2016

(54) BEARING ELEMENT FOR SUPPORTING THE ROTOR HUB OF A WIND TURBINE

(75) Inventors: Alexander Kari, Fuschl am See (AT); Christian Forstner, Gmunden (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 1029 days.

(21) Appl. No.: 13/640,613

(22) PCT Filed: Apr. 14, 2011

(86) PCT No.: PCT/AT2011/000182
§ 371 (c)(1),
(2), (4) Date: Oct. 11, 2012

(87) PCT Pub. No.: WO2011/127510
PCT Pub. Date: Oct. 20, 2011

(65) Prior Publication Data
US 2013/0071246 A1  Mar. 21, 2013

(30) Foreign Application Priority Data
Apr. 14, 2010 (AT) .................................. A 599/2010

(51) Int. Cl.
*F03D 80/70* (2016.01)
*F16C 17/10* (2006.01)

(52) U.S. Cl.
CPC .............. *F16C 17/10* (2013.01); *F03D 80/70* (2016.05); *Y02E 10/722* (2013.01)

(58) Field of Classification Search
CPC .... F03D 1/0008; Y02E 10/722; F16C 17/02; F16C 17/045; F16C 17/065; F16C 17/10; F16C 17/105
See application file for complete search history.

(56) References Cited

U.S. PATENT DOCUMENTS

| | | | | |
|---|---|---|---|---|
| 714,114 A | * | 11/1902 | Sceets | F16C 17/02 384/162 |
| 1,593,251 A | | 7/1926 | Flintermann | |
| 2,099,661 A | * | 11/1937 | Sharp | F16C 17/14 384/98 |
| 2,276,143 A | * | 3/1942 | Bell | F16C 33/208 264/259 |
| 2,393,017 A | * | 1/1946 | Boyd | F16C 33/26 384/297 |
| 3,497,278 A | * | 2/1970 | Orndorff, Jr. | F16C 33/22 384/98 |
| 3,826,547 A | * | 7/1974 | Finefrock | F16C 27/02 384/98 |

(Continued)

FOREIGN PATENT DOCUMENTS

| DE | 100 43 936 | 4/2002 |
|---|---|---|
| DE | 202 08 133 | 10/2003 |

(Continued)

OTHER PUBLICATIONS

English machine translation of description for DE102007042770, translated by epo.org Oct. 15, 2015.*

(Continued)

*Primary Examiner* — Craig Kim
*Assistant Examiner* — Wayne A Lambert
(74) *Attorney, Agent, or Firm* — Collard & Roe, P.C.

(57) ABSTRACT

The invention relates to a bearing element (7) for supporting the rotor hub (4) of a wind turbine (1), comprising at least one inner ring element (10, 40) and at least one outer ring element (11, 41), wherein a plain bearing is formed between the inner ring element (10, 40) and the outer ring element (11, 41), and wherein the plain bearing is formed by at least two plain bearings (8, 9, 38, 39) arranged at an axial distance (44) from one other.

15 Claims, 6 Drawing Sheets

(56) References Cited

U.S. PATENT DOCUMENTS

| | | | | |
|---|---|---|---|---|
| 4,012,085 | A * | 3/1977 | Kunderman | F16C 17/02 384/220 |
| 4,082,379 | A * | 4/1978 | Swearingen | F16C 17/22 384/162 |
| 4,663,810 | A * | 5/1987 | Kramer | B63H 23/326 264/258 |
| 4,725,151 | A * | 2/1988 | Orndorff, Jr. | B29C 43/003 384/125 |
| 4,834,559 | A * | 5/1989 | Kalvoda | F16C 32/0651 384/118 |
| 4,871,923 | A * | 10/1989 | Scholz | F03D 11/02 290/44 |
| 5,209,578 | A * | 5/1993 | Eastham | C23C 14/16 384/276 |
| 5,518,318 | A * | 5/1996 | Orndorff, Jr. | B63H 23/326 384/98 |
| 6,120,187 | A * | 9/2000 | Ono | F16C 9/04 384/273 |
| 6,238,093 | B1 * | 5/2001 | Orndorff, Jr. | B29C 66/61 384/125 |
| 6,502,992 | B2 * | 1/2003 | Nakazeki | F16C 17/105 384/107 |
| 6,575,635 | B1 * | 6/2003 | Tsuji | F16C 33/124 384/276 |
| 6,790,156 | B2 | 9/2004 | Hösle | |
| 6,814,493 | B2 | 11/2004 | Wobben | |
| 7,084,522 | B2 | 8/2006 | Wobben | |
| 7,367,713 | B2 * | 5/2008 | Swann | F16C 17/03 384/117 |
| 7,541,086 | B2 | 6/2009 | Gärtner et al. | |
| 7,642,668 | B2 * | 1/2010 | Kim | F03D 1/001 290/55 |
| 7,675,211 | B2 * | 3/2010 | Dimascio | F03D 11/0008 29/889 |
| 8,172,531 | B2 * | 5/2012 | Wadehn | F03D 1/0658 384/100 |
| 2008/0207389 | A1 | 8/2008 | Fahrenbach et al. | |
| 2009/0256442 | A1 * | 10/2009 | Stiesdal | F03D 9/002 310/90 |
| 2010/0032961 | A1 * | 2/2010 | Numajiri | F03D 1/0658 290/55 |
| 2010/0109327 | A1 * | 5/2010 | Nielsen | F03D 7/0204 290/44 |
| 2011/0057451 | A1 * | 3/2011 | Volmer | F03D 11/0008 290/55 |
| 2012/0099993 | A1 | 4/2012 | Guerenbourg et al. | |

FOREIGN PATENT DOCUMENTS

| | | | |
|---|---|---|---|
| DE | 102 55 745 | 6/2004 | |
| DE | 10 2005 051 912 | 5/2007 | |
| DE | 102007042770 A1 * | 3/2009 | F03D 11/0008 |
| EP | 1 184 567 | 3/2002 | |
| EP | 1 394 406 | 3/2004 | |
| EP | 1 764 522 | 3/2007 | |
| EP | 1 961 958 | 8/2008 | |
| JP | H09-112564 A | 5/1997 | |
| WO | WO 01/48376 | 7/2001 | |
| WO | WO 02/057624 | 7/2002 | |
| WO | WO 2011/003482 | 1/2011 | |

OTHER PUBLICATIONS

English machine translation of description for EP1394406, translated by epo.org Oct. 15, 2015.*

International Search Report of PCT/AT2011/000182, date of mailing Aug. 8, 2011.

* cited by examiner

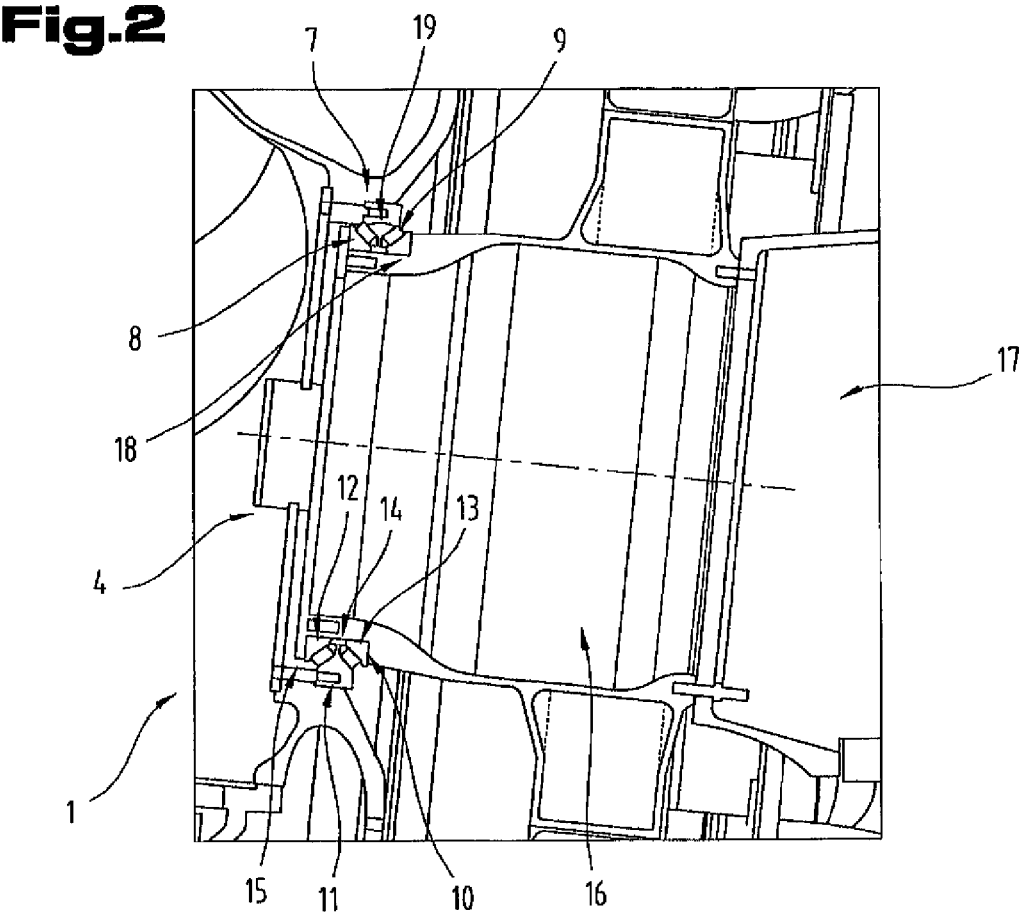
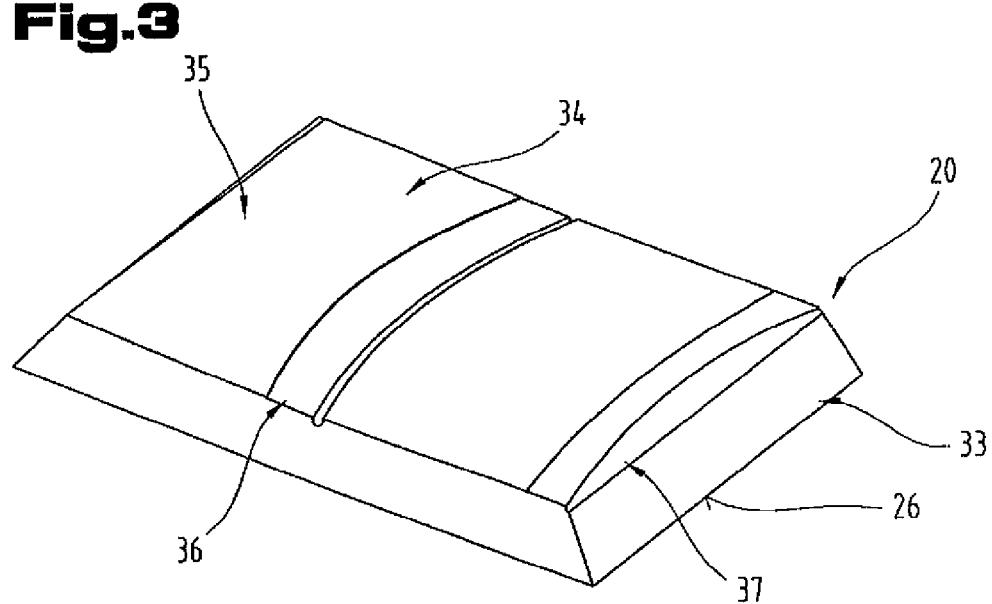

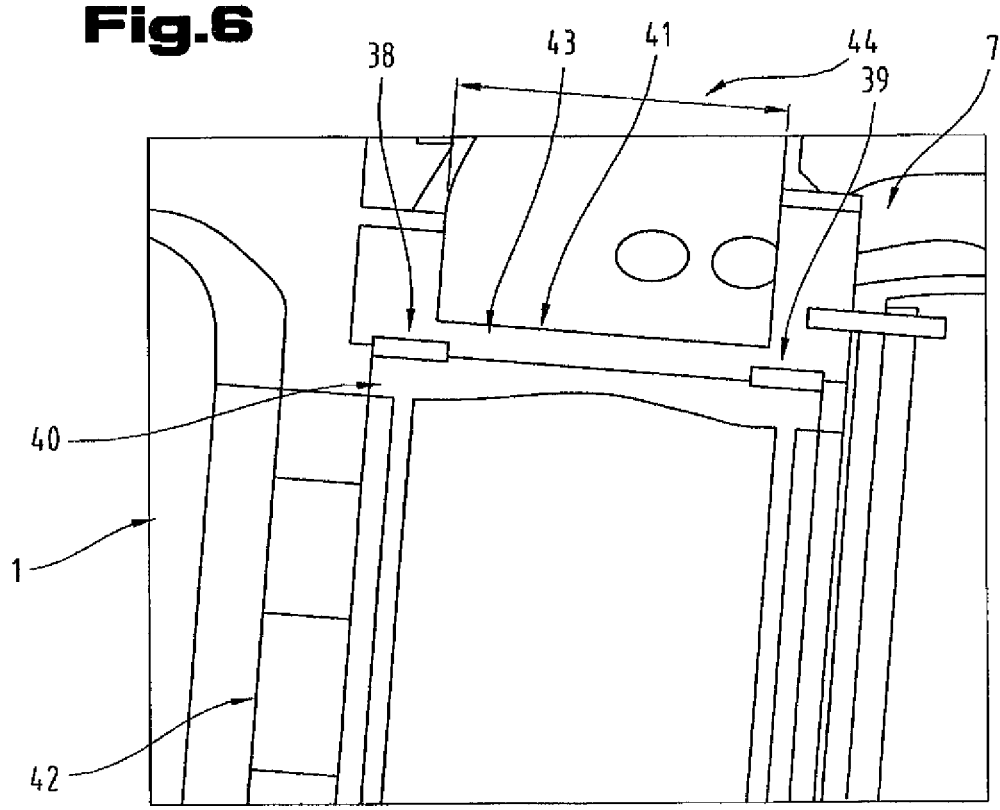
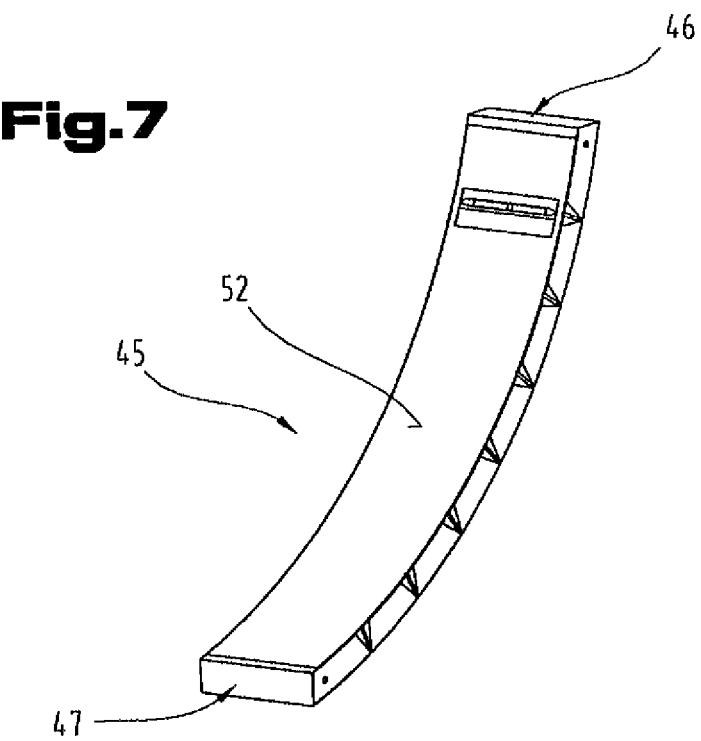

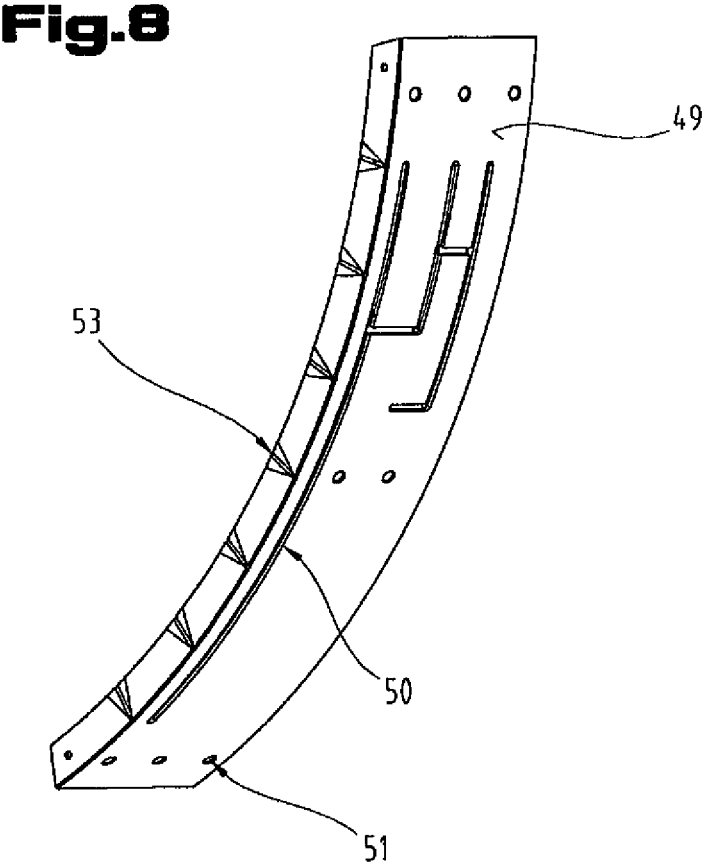
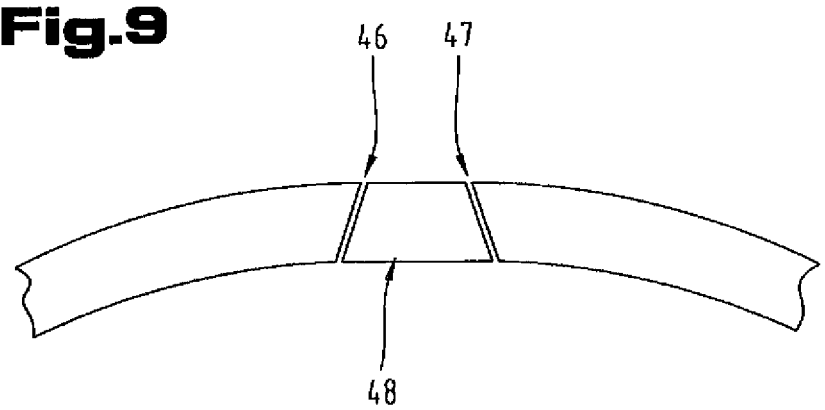

BEARING ELEMENT FOR SUPPORTING THE ROTOR HUB OF A WIND TURBINE

CROSS REFERENCE TO RELATED APPLICATIONS

This application is the National Stage of PCT/AT2011/000182 filed on Apr. 14, 2011, which claims priority under 35 U.S.C. §119 of Austrian Application No. A 599/2010 filed on Apr. 14, 2010, the disclosure of which is incorporated by reference. The international application under PCT article 21(2) was not published in English.

The invention relates to a bearing element for supporting the rotor hub of a wind turbine comprising at least one inner ring element and at least one outer ring element, wherein between the inner ring element and the outer ring element a plain bearing is formed, as well as a wind turbine with a rotor comprising a rotor hub which is supported on a stator, wherein a bearing element is arranged between the rotor and the stator.

Although plain bearings have a much longer lifetime than rolling bearings, at the moment rolling bearings are still mainly used in wind turbines, in particular as the main bearings for the rotor bearing. Various studies on wind turbines have shown that failures caused by "bearings", in addition to various other reasons for failure, which occur in the region of the generator or the rotor blades themselves or the rotor as a whole, are extremely common, and account for the middle third of all causes of failure. Compared to other faults that occur in wind turbines however in terms of cost the problem is completely different in that the failure of the rotor shaft incurs much higher costs and longer downtimes than other common faults that occur in wind turbines. Despite the tried and tested technology of the "rolling bearing" faults in the bearing, in particular of the multi-megawatt category, result in a clear reduction in the economic efficiency of wind turbines because of the high maintenance and repair costs and long periods of downtime. This is a particular problem for off-shore applications because of the restricted accessibility of the installation and this is associated with even higher costs. Reasons for the high cost of failure or long downtimes are that when the bearing fails and rolling bearings are used the entire rotor generally has to be removed.

To address this problem the use of plain bearings in wind turbines has already been described in the prior art. Thus for example DE 102 55 745 A1 describes a wind power installation with a machine base arranged at the top of a tower, with a generator stator secured to the machine base, comprising a hub supporting rotor blades and a generator rotor which is secured to the hub, wherein the generator rotor or the hub connected to the generator rotor is mounted in one place located radially between and/or axially next to the generator stator and the generator rotor and supported on the stator housing. The bearing provided can be a hydrostatic plain bearing, wherein the plain bearing can be configured as a segmented plain bearing which is integrated into the pole shoe of the generator. In this way the mechanical load paths are shortened and the weight of the wind power installation is reduced in the area of the gondola in the tower head.

Furthermore, in the field of transmission gearing for wind generators the use of plain bearings has been described in the prior art, for example in EP 1 184 567 A2. The latter describes a gear unit for wind generators with a rotor which is in drive connection with at least one generator by means of a multistage planetary gear arrangement and at least one spur gear stage. The rotor is mounted in the housing of the gear unit, in particular is guided in plain bearings, wherein at least one bearing can absorb axial forces, the bearings can be lifted hydrostatically and can be switched by the specific control of an oil pump into operation with partial or full hydrodynamic lubrication.

From DE 100 43 936 A1 a plain bearing for an tower slewing ring bearing of a wind turbine is known, which comprises an outer ring and an inner ring arranged concentrically thereto and anti-frictional coating carriers, wherein anti-frictional coatings are applied to the carriers. The anti-frictional coating carriers are arranged in radial bores of the inner ring and engage in a peripheral groove on the inside of the outer ring. It is possible in this way to make it easier to replace the plain bearing.

DE 10 2005 051 912 A1 also describes in general the possibility of supporting the rotor blades by means of plain bearings.

The objective of the present invention is to provide an improved plain bearing for the rotor hub of a wind turbine. This objective of the invention is achieved on the one hand by the aforementioned bearing element, in which the bearing is formed by at least two plain bearings arranged apart from one another axially, and on the other hand by a wind turbine equipped with said bearing element.

It is advantageous that by means of two spaced apart plain bearings an improved, radial or axial bearing or guiding of the rotor hub of the wind turbine is achieved. Furthermore, by means of the two plain bearings the plain bearing can be exposed to greater loads, which may occur in particular during so-called slow-speed operation or in start/stop cycles of wind turbines or also during periods of wind peaks and changing wind directions. Surprisingly, it has also been found that hydrostatic start-up support for the plain bearing is not necessary, whereby a structurally simpler solution for this anti-frictional bearing can be achieved as well as a reduction in cost.

According to a preferred embodiment variant of the invention at least one of the plain bearings is formed by plain bearing pads arranged next to one another in circumferential direction. With the arrangement of the whole bearing surface on individual plain bearing pads the plain bearings are easier to handle, both in respect of the installation of the plain bearing pads and in respect of their removal in case of a possible fault in the bearing. In addition, the advantage is that in the case of an operating fault in the wind turbine caused by the bearing only relatively few units have to be replaced, and compared to rolling bearings or plain bearing half shells not only can the periods of downtime be reduced by reducing the maintenance work but also the economic efficiency of the installation can be improved by reducing maintenance costs, in that only parts of the plain bearing have to be replaced where the fault has occurred, i.e. not as in plain bearing half shells where a complete half shell has to be replaced, whereby the replacement can be performed in particular without removing the rotor. Of course, if necessary the replacement of all of the plain bearing pads is possible in this embodiment variant.

According to one embodiment variant the number of plain bearing pads per plain bearing is selected from a range with a lower limit of D/10 and an upper limit of D/2, in particular a range with a lower limit of D/8 and an upper limit of D/4, wherein D in centimeters is the maximum diameter of the inner ring element. In this way despite the distribution of the plain bearings on individual pads a relatively large area is available for the maximum theoretically possible plain bearing area available for bearing or load transfer by the bearings.

It is possible to improve the bearing function if the two plain bearings are arranged in planes that are at an angle to one another, as in this way tilting moments can be absorbed more effectively.

Preferably, the angle that the two planes form with one another is selected from a range with a lower limit of 30° and an upper limit of 75°, in particular from a range with a lower limit of 35° and an upper limit of 60°. In this way the effects described above relating to the two plain bearings at an angle to one another could be improved further.

The plain bearing pads can be arranged and fixed simply if the outer ring element on the surface facing the plain bearing pads has grooves and the plain bearing pads are partly arranged in said grooves.

A further improvement to fixing the plain bearing pads is achieved if the grooves have a cross section that widens in the direction of a groove base, in particular a dovetail or T-shaped cross section, and the plain bearing pads have a cross section corresponding thereto.

To make it easier to replace the plain bearing pads and to adjust the plain bearing pads more easily, according to one embodiment variant of the invention the plain bearing pads are fixed to a detachable securing element on the outer ring element.

It is also possible that the inner ring element comprises two rings arranged next to one another in axial direction and spaced apart from one another in axial direction, whereby if necessary a spacer element is arranged between the rings, and the securing element is arranged at least partly between said two rings. In this way it becomes easier to exchange the plain bearing pads, whereby owing to the weight force the rotor, i.e. the rotor hub, is supported in the idle position in the region of the lower plain bearing pads, so that the upper plain bearing pads are load-free and can be removed from the plain bearing. By means of the two rings it is achieved in addition that said plain bearing pads can be removed in the area between the rings, in that the securing element is released and thus the fixing of the plain bearing pads is released on the outer ring element, so that subsequently said plain bearing pads can be pushed out of the grooves easily.

According to a further embodiment variant of the invention two plain bearing pads arranged next to one another in axial direction are fixed by a common securing element to the outer ring element, whereby on the one hand the structural configuration of the plain bearing can be simplified and in addition also maintenance work can be performed in a short time period. In this way the setting of the plain bearing is also simplified.

To improve the oil intake the plain bearing pads are provided on at least one end face at least partly with a rounded part.

According to one embodiment variant of the plain bearing the two plain bearings are arranged at a distance from one another, which is at least 40% of the maximum circumferential length of the inner ring element. By arranging the plain bearings relatively far apart from one another tilting moments which act via the rotor hub on the plain bearing can be better absorbed.

In this embodiment variant it is also possible for the plain bearings to be formed by plain bearing segments in order to improve the handling of said relatively large plain bearing.

In this embodiment variant of the invention a wedge element is arranged between the end faces pointing towards one another of the plain bearing segments of a plain bearing, whereby said wedge element can be screwed to the inner or outer ring element, whereby on the one hand a pressing, i.e. fixing of the plain bearing segments is achieved and thereby also the adjustment of the plain bearing is improved, whereby in addition by means of said wedge elements the ability to replace the plain bearing segments can be simplified, in that by simply releasing the wedge elements the fixing of the plain bearing segments is released.

According to one embodiment variant the end faces of the plain bearing segments are slanted, thereby supporting the wedging effect of the wedge element.

Grooves and/or bores can be provided in a segment back of the plain bearing segments in order to achieve a specific oil supply per segment in those areas of the plain bearing or plain bearing segments which are exposed to increased stress. It can be achieved in this way that only a minimum amount of oil needs to be supplied to the plain bearing segments, so that thus no initial hydrostatic support is necessary which usually operates at oil pressures of over 1 bar, normally much greater than 100 bar.

The plain bearings are preferably in the form of multi-layered bearings, in order in this way to improve the bearing function, in particular the anti-frictional quality and the support function of said plain bearings.

In this case the top layer of the multi-layered bearing can have an interrupted surface, on the one hand in order to supply oil to the anti-frictional surface. On the other hand it has been found that with better load distribution the load-absorbing ability of the plain bearings can be increased in this way.

In a complete reversal of the view that the anti-frictional layer facing the rotor hub should be relatively soft, according to the invention in one embodiment variant an anti-frictional layer is used which has a hardness of at least 75 HV (0.001), in particular at least 100 HV (0.001), at least on the anti-frictional surface, so that no soft bearing materials are used. In this way the lifetime of the bearing elements is increased, without a significant reduction of the anti-frictional quality of said bearing elements, i.e. the plain bearings. In addition, it has been observed that by using hard anti-frictional layers the oil intake is improved, in particular in the start-up phase, so that no hydrostatic support is necessary in the start-up phase. Surprisingly also anti-frictional paints can be used for the anti-frictional layer, although the latter have a Vickers' hardness of about 25 HV (0.001) to 60 HV (0.001), i.e. are much softer than the anti-frictional layers described above, but the hardness can be increased by adding suitable hard particles.

It is possible by means of the bearing element according to the invention to operate the wind turbine only hydrodynamically in the area of the bearing, so that structural measures for maintaining a specific minimum oil pressure, which in hydrostatic installations is at least 1 bar, but normally much greater than 100 bar, can be avoided so that the wind turbine can be designed to be simpler in structure.

According to one embodiment variant of the wind turbine the inner ring element of the bearing element is part of the rotor shaft and the outer ring element is part of the stator, whereby the structural configuration of the plain bearing can be simplified.

Lastly, according to one embodiment variant of the wind turbine it is possible for the plain bearing pads to be removed through the stator itself, whereby the accessibility of said plain bearing pads is simplified during maintenance work and thus it is possible to avoid using large lifting machines, which are necessary for example for the replacement of rolling bearings, so that in this way periods of downtime for maintenance work on the bearing, in particular on the main bearing, can be reduced.

For a better understanding of the invention the latter is explained in more detail with reference to the following details.

In a much simplified view:

FIG. 2 shows a first embodiment variant of a bearing element in side view in cross section;

FIG. 3 shows a plain bearing pad in oblique view;

FIG. 6 shows a section of a further embodiment variant of a plain bearing in side view in cross section;

FIG. 7 shows a plain bearing segment with a view of the anti-frictional surface;

FIG. 8 shows the plain bearing segment according to FIG. 7 with an oblique view of the back;

FIG. 9 shows partly two plain bearing segments with a wedge element arranged in between.

Figure 1:
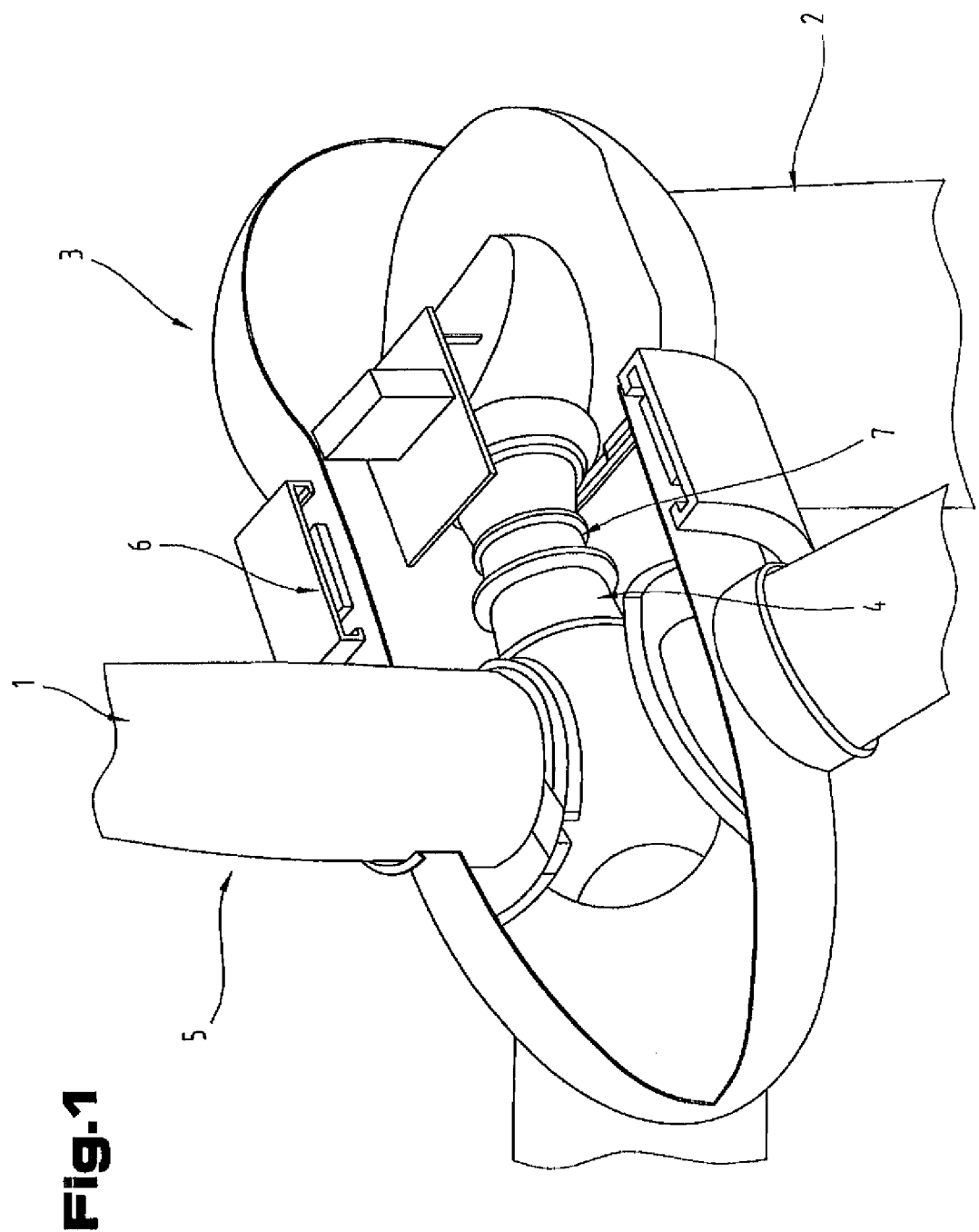
FIG. 1 shows a section of a wind turbine in partial cross section.

First of all, it should be noted that the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows in an oblique view and partly in cross section a section of a wind turbine 1, as known in principle from the prior art. Said wind turbine 1 comprises a tower 2, with a gondola 3 at the top. In said gondola 3 a rotor hub 4 is arranged which supports rotor blades 5 at one end, in particular rotatably. A generator 6, which is configured in this case as a ring generator, is assigned to the other end for the power supply. The rotor shaft is mounted rotatably by a bearing element 7 in the gondola 3. The bearing element 7 is the so-called main bearing of the wind turbine 1.

As shown in FIG. 1, the wind turbine 1 is a gearless design which means that there is no transmission gearing between the rotor itself, that is the rotor blades 5, and the generator 6. The latter is a so-called low-speed motor. In contrast wind turbines are also known from the prior art which have a transmission gear, often a planetary gear, between the rotor and the generator, so that the rotor of the generator operates faster than the rotor hub.

Preferably, the invention relates to the former, i.e. the gearless type of wind turbine 1, although the invention can also be applied to wind turbines with transmission gearing.

FIGS. 2 to 5 show a first embodiment variant of the bearing element 7 according to the invention. FIG. 2 shows a section of the wind turbine 1 in the region of the rotor hub 4. The bearing element 7 is formed by a plain bearing with two plain bearings 8, 9 arranged spaced apart from one another axially or comprises the latter. The axial spacing is defined as the direction along the longitudinal middle axis through the rotor hub 4.

In addition to the two plain bearings 8, 9 the bearing element 7 also comprises an inner ring element 10 and an outer ring element 11. The inner ring element 10 is configured in two parts with a first ring 12 and a second ring 13, wherein between the rings 12, 13 a spacer element 14 is arranged so that the two rings 12, 13 are spaced apart from one another in axial direction.

The plain bearings 8, 9 are arranged between said two ring elements 10, 11, whereby the outer ring element 11 is rotatable and the inner ring element 10 is arranged to be stationary, i.e. is fixed. The outer ring element 11 is also connected by a corresponding securing arrangement 15 to the rotor hub 4 or the rotor. To secure the inner ring element 10, that is the two rings 12, 13 in this embodiment variant, an annular groove 18 can be formed in an outer surface on a generator stand 16, which is secured to a machine base 17, in which surface the inner ring element 10 is arranged at least partly, in particular is fixed.

The two plain bearings 8, 9 are arranged in this embodiment variant preferably in two different planes which together enclose an angle 19. The angle 19 can be selected from a range with a lower limit of 30° and an upper limit of 75°, in particular from a range with a lower limit of 35° and an upper limit of 60°. By means of the angled arrangement of the two plain bearings 8, 9 tipping moments can be absorbed more effectively by the bearing element 7.

Figure 4:
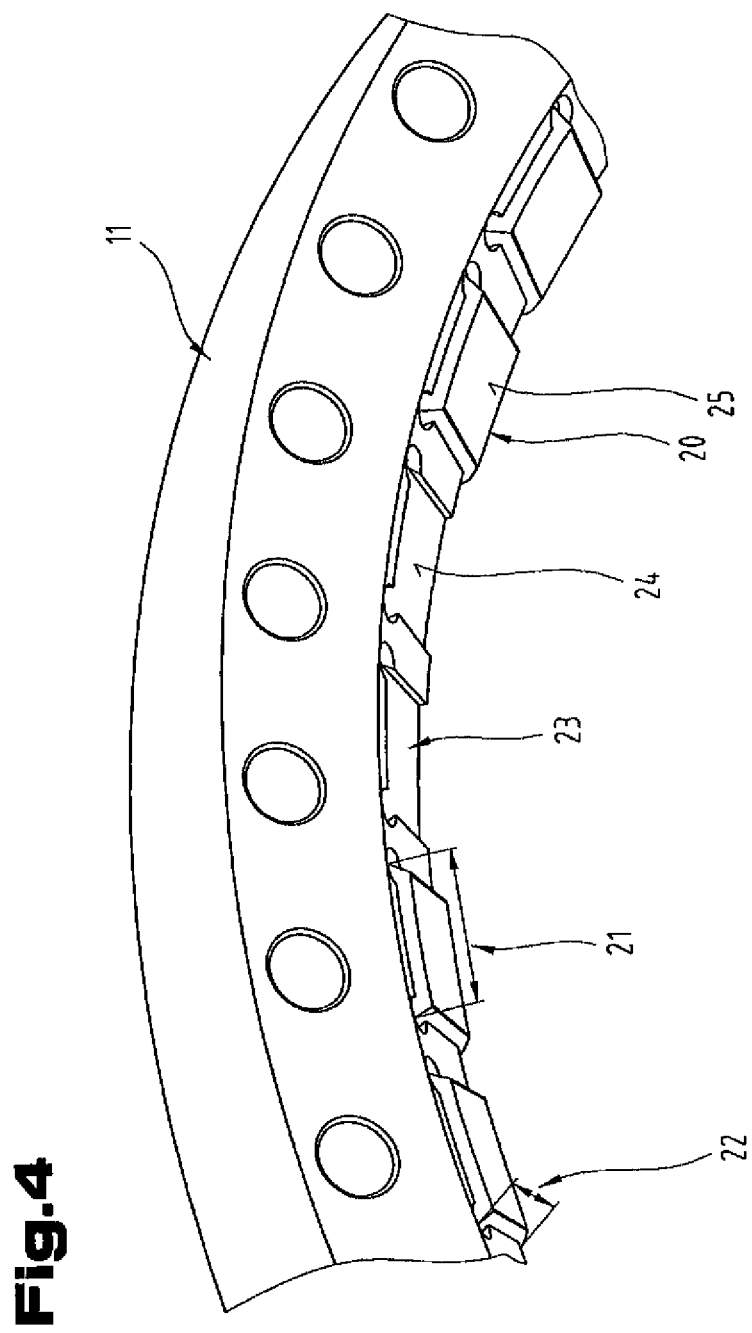
FIG. 4 shows a section of an arrangement of plain bearing pads in an oblique view from below.

As shown in FIGS. 3 and 4 the two plain bearings 8, 9 according to FIG. 2 are formed by plain bearing pads 20 or comprise said plain bearing pads 20. A plurality of said plain bearing pads 20 are arranged in circumferential direction next to one another distributed around the generator stand 16, in particular spaced apart, in order thus to form the bearing surface. In particular, the number of plain bearing pads 20 per plain bearing 8, 9 is selected from a range with a lower limit of D/10 and an upper limit of D/2, wherein D in centimeters is the maximum diameter of the inner ring element 10. For example, with a bearing diameter of 2.2 m 50 such plain bearing pads 20 can be arranged distributed around the circumference.

Of course, the number of plain bearing pads 20 corresponds to the size of the circumference so that a different number of plain bearing pads 20 can be provided. Said plain bearing pads 20 can for example have a length 21 in circumferential direction of 122 mm and a width 22 perpendicular thereto of 194 mm. For example, said plain bearing pads can have a size of in the order of Deutsches Institut für Normung e.V. (DIN) A5 to DIN A4.

It is also possible for only one of the plain bearings 8, 9 to be provided with such plain bearing pads 20.

The plain bearing pads 20 are preferably secured to the outer ring element 11. In addition according to one embodiment variant, as shown in FIG. 4, in this outer ring element 11 on the surface facing the plain bearing pads 20 grooves 23 are provided into which the plain bearing pads 20 can be inserted. Preferably, said grooves 23 have a cross section which widens from the surface in the direction of a groove base 24, in particular said grooves 23 are configured in cross section to be at least approximately dovetail or T-shaped, wherein the plain bearing pads 20 have a complementary cross section, i.e. a cross section which increases from an anti-frictional surface 25 in the direction of a plain bearing pad back 26. Thereby, at least to some degree said plain bearing pads 20 are fixed in radial direction. The cross sectional widening can be formed on all side walls of the grooves 23 or only on individual side walls, for example only on the rear side wall.

It is also possible for these grooves 23 to be rounded in the corner areas—preferably with the exception of the front corner areas, on which the plain bearing pads are inserted as also shown in FIG. 4.

The counter running surface formed by the inner ring element 10, i.e. the rings 12, 13 in this embodiment variant, is formed in particular by steel, so that said ring element 10 can be shaped from steel, like the outer ring element 11.

Figure 5:
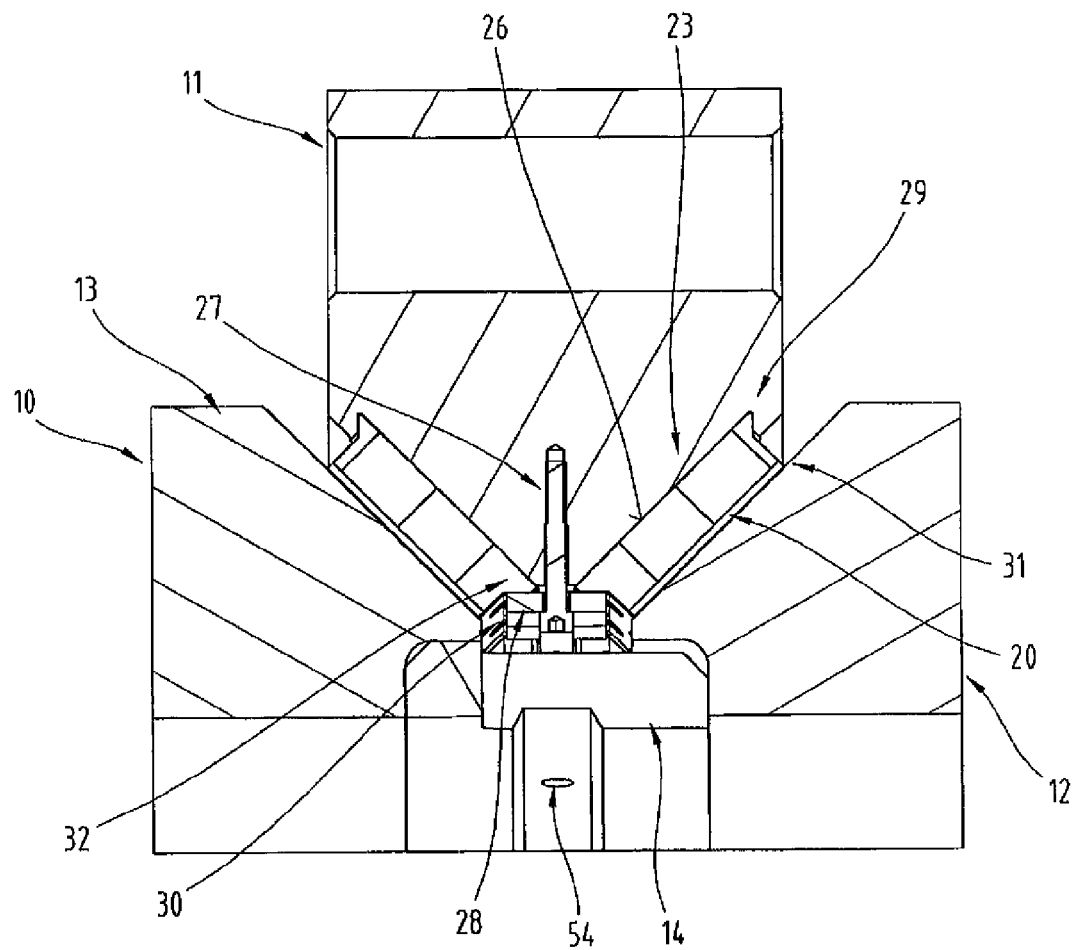
FIG. 5 shows a cross section of a plain bearing in side view.

The securing of the plain bearing pads 20 onto the outer ring element 11, so that the plain bearing pads 20 are better protected during operation from sliding out of the grooves 23, can be performed by various different methods, for example by welding spots, soldering spots, clamping elements etc. Preferably, the securing is performed, as shown in FIG. 5, by means of a detachable securing element 27, in particular a screw. It should be noted that FIG. 5 shows in an enlarged view the outer ring element 11, the inner ring element 10, consisting of the two rings 12, 13 and the spacer element 14 arranged in between 14.

The securing element 27 is preferably formed by a threaded screw, whereby the plain bearing pads 20 are prevented by washers 28 from sliding out of the grooves 23 in the outer ring element 11. In addition, the plain bearing pads 20, as shown in FIG. 5, can be configured in the region of the plain bearing pad back 26 at least partly in end sections 29, 30 partly opposite one another in the direction of the width 22 to be at least approximately wedge-shaped (in the direction of length 21), whereby a wedge 31 is used for fixing the plain bearing pad 20 in the groove 23 of the outer ring element 11, for which reason said groove 23 has a corresponding, opposing contour, and a further wedge 32 is supported on the washers 28. It is achieved in this way that by means of the oblique position of the plain bearing pads 20 and by means of screwing in the securing element 27 the plain bearing pad 20 is pressed into the groove 23 of the outer ring element 11.

As shown in particular in FIG. 5 the securing element 27 is arranged—as viewed at least almost centrally in axial direction—in the outer ring element 11, so that by means of a securing element 27 respectively two opposite plain bearing pads 20 of the two plain bearings 8, 9 can be held and fixed.

The plain bearing pads 20 preferably have a multi-layered structure, as shown in FIG. 3, and comprise at least one support layer 33 and one anti-frictional layer 34 arranged thereon. If necessary further layers can be arranged between the support layer 33 and the anti-frictional layer 34, for example a bearing metal layer and/or a bonding layer or a diffusion barrier layer.

The anti-frictional layer 34 is preferably configured to be interrupted at least in the surface area, so that several, in particular two, anti-frictional layer part surfaces 35 are formed. It has been established that by means of a divided anti-frictional layer 34 a better load distribution can be achieved on the latter.

Of course, it is possible within the scope of the invention to have several subdivisions, in particular also three, four, five or six anti-frictional layer part surfaces 35, according to the size of the area of the anti-frictional layer 34.

Recesses 36, in particular grooves, can be provided between the anti-frictional layer part surfaces 35, which can extend for example only over a portion of the layer thickness of the anti-frictional layer 34 or over the entire layer thickness. Said grooves 36 can be used in particular as oil supply grooves.

It is also possible according to one embodiment variant of the invention that one end face 37 at least of the anti-frictional layer 34 is provided at least partly with a rounded part, in order to achieve in this way a better intake of oil in the area of the anti-frictional layer 34, that is the running surface of the plain bearing pads 20. As can be seen in particular in FIG. 4, said rounded area extends in the area of at least one of the side walls of the grooves 23 in the outer ring element 11, whereby if necessary both side areas, i.e. both end faces 37, which are opposite one another and bear against the side walls of the groove, at least of the anti-frictional layer 34 can be provided with such a rounded part, so that the anti-frictional layer 34 in plan view has a hyperbolic external contour and thereby a central area of the anti-frictional layer 34 is further removed from the side wall of the grooves 23 than a corner area.

Of course, the surface of the plain bearing pads 20 can also be designed to be rounded, that is the surface of at least the anti-frictional layer 34 is adjusted to the rounding of the inner ring element 10.

In particular, the anti-frictional layer 34 consists of a relatively hard plain bearing material with a hardness of at least 75 HV (0.001), in particular of at least 100 HV (0.001), at least on the anti-frictional layer surface 35. For example, the anti-frictional layer can be made from a material which is selected from a group comprising aluminum-based alloys, such as AlSn20Cu, AlZn4Si3, silver-based alloys or copper-based alloys, possibly with bismuth, bismuth-based alloys.

As already mentioned above the anti-frictional layer 34 can also be formed by an anti-frictional paint, whereby in this case the anti-frictional layer 34 has a hardness of between 25 HV (0.001) to 60 HV (0.001).

The anti-frictional paints used can be for example polytetrafluorethylene, resins containing fluorine, such as e.g. perfluoroalkoxy-copolymers, polyfluoroalkoxy-polytetrafluoroethylene-copolymers, ethylene-tetrafluoroethylene, polychlorotrifluoroethylene, fluorinated ethylenepropylene copolymers, polyvinyl fluoride, polyvinyl idene fluoride, alternating copolymers, statistical copolymers, such as e.g. perfluoroethylene propylene, polyester imides, bismaleimides, polyimide resins, such as e.g. carboranimides, aromatic polyimide resins, hydrogen-free polyimide resins, polytriazo-pyromellithimides, polyamide imides, in particular aromatic, polyarylether imides, possibly modified by isocyanates, polyether imides, possibly modified by isocyanates, epoxy resins, epoxy resin esters, phenolic resins, polyamides 6, polyamides 66, polyoxymethylene, silicons, polyarylethers, polyaryl ketones, polyarylether ketones, polyarylether-ether ketones, polyether ether ketones, polyether ketones, polyvinylidene difluoride, polyethylene sulfides, allylene sulfide, poly-triazo-pyromellithimides, polyester imides, polyaryl sulfides, polyvinylene sulfides, polyphenylene sulfides, polysulfones, polyether sulfones, polyaryl sulfones, polyaryl oxides, polyaryl sulfides, as well as copolymers thereof.

An anti-frictional paint is preferable, which in a dry state comprises 40 wt. % to 45 wt. % MoS2, 20 wt. % to 25 wt. % graphite and 30 wt. % to 40 wt. % polyamide imide, whereby the anti-frictional paint can also comprise if necessary hard particles, such as e.g. oxides, nitrides or carbides in a proportion of a total of a maximum of 20 wt. % which replace a proportion of the solid lubricants.

The support layer 33 can be made for example of steel or a copper-based alloy, in particular with zinc, for example CuZn31Si, CuSnZn, an AlZn or a CuAl alloy.

FIGS. 6 to 8 show another embodiment variant of the bearing element 7 for a wind turbine 1. The bearing element 7 consists of two plain bearings 38, 39 arranged axially spaced apart from one another which are arranged between an inner ring element 40 and an outer ring element 41. In the preferred embodiment variant in this case the inner ring element 40 is a part of a rotor hub 42 and the outer ring element 41 is part of a stator 43 of the wind turbine 1. Unlike the embodiment variant of the invention described above, in this embodiment variant the inner ring element 40 is arranged rotatably and the outer ring element 41 is fixed.

The two plain bearings 38, 39 are arranged in one plane in this embodiment variant, whereby it is of course possible that said two plain bearings 38, 39 can also be arranged in this embodiment variant in two planes arranged at an angle to one another.

Preferably, said two plain bearings 38, 39 are spaced relatively far apart from one another, whereby a distance 44 between the two plain bearings 38, 39, measured between the end faces pointing towards one another in circumferential direction of the plain bearings 38, 39, is at least 40%, in particular at least 50%, of a maximum circumferential length of the inner ring element 40. By means of this wide spacing between the two plain bearings 38, 39 it is possible that the bearing element 7 can be exposed to higher loads, in particular tilting moments acting on the rotor can be better absorbed in this way.

Preferably, the two plain bearings 38, 39 are in the form of plain bearing segments 45, as shown in FIGS. 7 and 8, so that over the circumference of the inner ring element 40 a plurality of plain bearing segments 45 form a plain bearing 38 or 39. Various different methods can be used to secure the plain bearing segments 45 to the stator 43, as already described above, whereby according to a preferred embodiment variant the plain bearing segments 45 are slanted at the end faces 46, 47 and a wedge element 48 is arranged between the plain bearing segments 45 for the pretensioning or securing thereof, as shown in FIG. 9, whereby by means of said wedge element 48 the plain bearing segments 45 are pressed against the inner surface of the outer ring element 41. Also in this embodiment variant the plain bearing segments 45 are arranged spaced apart from one another—as seen in circumferential direction—as defined by the wedge elements 48 arranged in between.

To arrange the two plain bearings 38, 39 between the inner ring element 40 and the outer ring element 41 it is also possible in this embodiment variant to provide a groove in the inner ring element 40, that is on a surface of the inner ring element 40 facing the outer ring element and/or on a surface of the outer ring element 41 facing the inner ring element 40.

As shown in particular in FIGS. 7 and 8 grooves 50 and/or bores 51 for supplying or generally for guiding lubricating oil can be arranged on a segment back 49 of the plain bearing 38, 39, in order to form more effectively a lubricant film in particularly stressed areas of the plain bearing 38, 39. It should be mentioned however that the bearing element 7 according to the invention can preferably be operated only hydrodynamically, so that no hydrostatic is required to support the start-up. The term "only hydrodynamically" is defined in the invention to mean that no oil pressure of over 1 bar is maintained so that only a minimum amount is supplied via the at least one groove and/or the at least one bore 51 of an anti-frictional surface 52. Thus a targeted supply of oil to each plain bearing segment 45 is possible via said grooves 50 or bores 51.

Of course, it is also possible in the embodiment with the plain bearing pads 20 to provide a targeted oil supply to the anti-frictional layer surface or anti-frictional layer part surface 35 of the plain bearing pad 20 via the plain bearing pad back 26 via corresponding grooves or bores.

It should also be mentioned that the choice of material for the plain bearings 8, 9 of the first embodiment variant of the invention can also be applied to the plain bearings 38, 39, so that said plain bearings 38, 39 are preferably also configured as multi-layered plain bearings.

Both the plain bearing pads 20 and the plain bearing segments 45 can be configured not only as radial plain bearings, but also on at least one end face formed parallel to the circumferential direction can be provided with a corresponding anti-frictional layer material, so that additional axial bearing is achieved by said plain bearing pads 20 or plain bearing segments 45.

It is also possible to achieve in this way a targeted oil supply, as shown for example in FIG. 8, which shows the corresponding recesses 53 for the oil supply in said end faces of the plain bearing segments 45.

The replacement of the plain bearing segments 45 or the installation of said plain bearing segments 45 into the bearing element 7 can be performed by lateral removal from or lateral insertion into the bearing element 7—as viewed in axial direction.

However, the plain bearing pads 20 can be removed via the stator in the area of an oil supply 54, as shown in FIG. 5. For this only the securing element 27 is released and removed if necessary, as well as the spacer element 14. As a result said plain bearing pads 20 can be removed respectively obliquely downwards out of the grooves 23. The installation or replacement of said plain bearing pads 20 can be performed in exactly the reverse order.

It is thus possible in all of the embodiment variants of the invention to exchange only individual parts of the plain bearings 8, 9 or 38, 39, so that unlike with a rolling bearing the entire bearing element 7 or the entire rolling bearing does not have to be replaced. The embodiment according to FIGS. 2 to 5 also has the advantage that said bearing element 7 can replace an oblique roller rolling bearing, as used currently as the main bearing for supporting the rotor, so that such bearing elements 7 can also replace the previously used rolling bearings in existing installations during maintenance work.

The exemplary embodiments show possible embodiment variants of the bearing element 7, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the bearing element 7 the latter and its components have not been represented true to scale in part and/or have been enlarged and/or reduced in size.

The individual embodiments shown in FIGS. 1 to 9 can form the subject matter of independent solutions according to the invention.

| List of Reference Numerals | |
|---|---|
| 1 | wind turbine |
| 2 | tower |
| 3 | gondola |
| 4 | rotor hub |
| 5 | rotor blade |
| 6 | generator |
| 7 | bearing element |
| 8 | plain bearing |
| 9 | plain bearing |
| 10 | ring element |

| List of Reference Numerals | |
|---|---|
| 11 | ring element |
| 12 | ring |
| 13 | ring |
| 14 | spacer element |
| 15 | securing arrangement |
| 16 | generator stand |
| 17 | machine base |
| 18 | annular groove |
| 19 | angle |
| 20 | plain bearing pad |
| 21 | length |
| 22 | width |
| 23 | groove |
| 24 | groove base |
| 25 | anti-frictional surface |
| 26 | plain bearing pad back |
| 27 | securing element |
| 28 | washer |
| 29 | end section |
| 30 | end section |
| 31 | wedge |
| 32 | wedge |
| 33 | support layer |
| 34 | anti-frictional layer |
| 35 | anti-frictional layer part area |
| 36 | groove |
| 37 | end face |
| 38 | plain bearing |
| 39 | plain bearing |
| 40 | ring element |
| 41 | ring element |
| 42 | rotor hub |
| 43 | stator |
| 44 | distance |
| 45 | plain bearing segment |
| 46 | end face |
| 47 | end face |
| 48 | wedge element |
| 49 | segment back |
| 50 | groove |
| 51 | bore |
| 52 | anti-frictional surface |
| 53 | recess |
| 54 | oil supply |

The invention claimed is:

1. A bearing element for supporting the rotor hub of a wind turbine with at least one inner ring element and at least one outer ring element, and with a plain bearing being formed between the inner ring element and the outer ring element, which is formed by at least two plain bearings arranged at an axial distance from one another, at least one of the plain bearings being formed respectively by plain bearing pads arranged next to one another in circumferential direction, wherein the outer ring element comprises grooves on the surface facing the plain bearing pads and the plain bearing pads are partly arranged in said grooves, wherein the plain bearing pads are secured to a detachable securing element on the outer ring element, and wherein two plain bearing pads arranged next to one another in an axial direction are fixed by a common securing element to the outer ring element.

2. The beating element as claimed in claim 1, wherein the number of plain hearing pads per plain bearing is selected from a range with a lower limit of D/10 and an upper limit of D/2, wherein D in cm is the maximum diameter of the inner ring element.

3. The bearing element as claimed in claim 1, wherein the two plain bearings are arranged in planes that are at an angle to one another.

4. The bearing element as claimed in claim 3, wherein the planes are arranged at an angle relative to one another which is selected from a range with a Lower limit of 30° and an upper limit of 75'.

5. The bearing element as claimed in claim 1, wherein the grooves have a cross section which widens in the direction of a groove base, and the plain bearing pads have a cross section corresponding thereto.

6. The bearing element as claimed in claim 1, wherein the inner ring element comprises first and second rings arranged next to one another in the axial direction and spaced apart from one another in the axial direction, and the securing element is arranged at least partly between the first and second rings.

7. The hearing element as claimed in claim 1, wherein the plain bearing pads are provided on at least one end side at least partly with a rounded section.

8. The bearing element as claimed in claim 1, wherein the plain bearings are in the for of multi-layered plain bearings.

9. The bearing element as claimed in claim 8, wherein the to layer of the multi-layered plain bearing has an uninterrupted surface.

10. The bearing element as claimed in claim 1, wherein at least one anti-frictional layer of the plain bearing has a hardness of at least 75 HV (0.001) at least on an anti-frictional surface.

11. A wind turbine with a rotor comprising a rotor hub, which is supported on a stator, and between the rotor and the stator a bearing element is arranged, wherein the bearing element is configured according to claim 1.

12. The wind turbine as claimed in claim 11, wherein the bearing element is operated solely hydrodynamically.

13. The wind turbine as claimed in claim 11, wherein the inner ring element of the bearing element forms a part of the rotor hub and the outer ring element forms a part of the stator.

14. The wind turbine as claimed in claim 11, wherein the plain bearing pads are removed through the stator.

15. The bearing element as claimed in claim 1, wherein at least one anti-frictional layer of the plain bearing is an anti-frictional paint and has a hardness between 25 HV (0.001) and 60 HV (0.001), at least on an anti-frictional surface.

* * * * *